United States Patent Office 3,246,044
Patented Apr. 12, 1966

3,246,044
PROCESS FOR MAKING 1,1,3,4,4,6-HEXAMETHYL-
1,2,3,4-TETRAHYDRONAPHTHALENE
Thomas F. Wood, Wayne, and George H. Goodwin, Rutherford, N.J., assignors to The Givaudan Corporation, New York, N.Y., a corporation of New Jersey
No Drawing. Filed June 10, 1963, Ser. No. 286,480
6 Claims. (Cl. 260—668)

The present invention relates to an improved process for preparing 1,1,3,4,4,6 - hexamethyl - 1,2,3,4 - tetrahydronaphthalene.

The product formed by the process of this invention is an intermediate for a material whose musk properties are such as to make it valuable in the art of perfumery. While the aforesaid product is known, the prior processes for its preparation involve the use of expensive starting materials, require multistep involved processes, and result in low yields of an impure product. The prior processes for making the product and compounds of its general type are described in the following scientific and patent literature: Davidson and Bogert, J. Am. Chem. Soc., 56, 185 (1934); U.S. Patent 2,915,561 and U.S. Patent 3,045,047.

By our present invention, we have succeeded in providing the desired product in good yields and in substantially pure form, by a process which employs inexpensive, readily-available starting materials and is technically simple.

In accordance with our invention, we have found that 1,1,3,4,4,6 - hexamethyl - 1,2,3,4-tetrahydronaphthalene is readily obtained by a simple, convenient procedure using cheap and readily available chemicals—namely α,p-dimethylstyrene and tert-butylethylene. The final reaction may be outlined as follows:

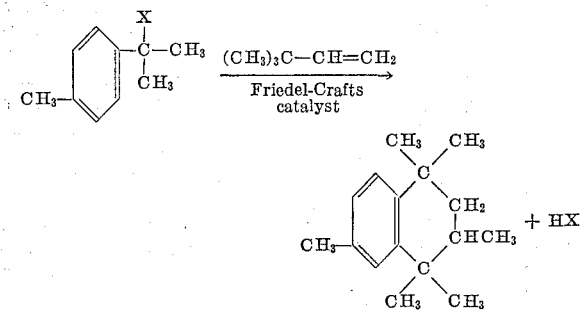

where X is a halogen, e.g., chlorine or bromine.

The exact mechanism for the formation of the tetrahydronaphthalene is not clear but it is evident that migration of a methyl group is involved. It is indeed surprising that a single pure isomer is obtained from the reaction and not a mixture of isomers as is often the case in Friedel-Crafts reactions.

It will be noted that, although the above text mentions the use of α,p-dimethylstyrene, the reaction as shown depicts dimethyl-p-tolylcarbinyl halide. The latter is formed by the addition reaction of equimolecular amounts of dimethylstyrene and hydrogen halide. It is preferred to react the thus-formed carbinyl halide, without purification and/or isolation, with tert-butylethylene. However, if desired, the carbinyl halide may be purified and/or isolated prior to use in the process of this invention. As will be understood by organic chemists, a gram molecular amount of the carbinyl halide is the chemical equivalent of a gram mole each of the dimethyl styrene and hydrogen halide.

Any of the halides may be used in accordance with this invention but we prefer the chloride.

Any of the known Friedel-Crafts catalysts may be used in our process. As examples, we mentioned aluminum chloride, aluminum bromide and ferric chloride. We prefer to use aluminum chloride.

In general, the amounts of reactants may vary within wide limits. However, we prefer to employ substantially stoichiometric amounts of the reactants, i.e., of α,p-dimethylstyrene, hydrogen halide and tert-butylethylene. Excellent results, however, are also obtained where from about 0.8 to about 1.2 moles of the latter are used for each mole of carbinyl halide or equivalent. It is preferred not to use any great molar excess of either the carbinyl halide or the tert-butylethylene, in order to avoid waste, due, for example, to polymerization.

The amount of Fridel-Crafts catalyst used may also vary over wide limits, as is customary in Friedel-Crafts reactions. We prefer to employ from about 2 to about 10%, based on the combined weight of the carbinyl halide and tert-butylethylene. While greater or smaller amounts of catalyst may be used, they are not recommended. Greater amounts do not result in any noticeable advantage and constitute a waste of catalyst. Smaller amounts cause the reaction to proceed at an undesirably slower rate.

The temperatures at which the process of our present invention may be conducted can also vary over wide limits. We prefer temperatures around ambient room temperatures, or even lower, e.g., within the range from about −10° C. and about 10° C. Lower or higher temperatures may be used, if desired, but they are not recommended. Temperatures substantially under −10° C. result in the desired reaction proceeding too slowly; and temperatures substantially above 10° C. result in the formation of by-products, with the consequent lowering of the yield of the desired product and/or need for special purification steps.

In carrying out the process of this invention, the hydrogen halide is added to the α,p-dimethylstyrene over a period of 2–3 hours, while the temperature is maintained within the desired limits by cooling the reaction mixture. The resulting dimethyl-p-tolylcarbinyl halide is mixed with the tert-butylethylene (3,3-dimethyl-1-butene) and then brought into contact with the Friedel-Crafts catalyst at the desired temperature. A preferred procedure is to add the mixture of the dimethyl-p-tolylcarbinyl halide and olefin, dropwise, into a well-stirred and cooled suspension of the Friedel-Crafts catalyst in a suitable solvent, such as ethylene dichloride or carbon tetrachloride, or other inert chlorinated hydrocarbon solvent. Other solvents, such as nitrobenzene and nitromethane, may be used, but the yield of desired product is usually lower when such solvents are employed. Evolution of hydrogen halide gas is observed during the reaction. An advantage of this preferred procedure is that the formation of α,p-styrene dimer is minimized, thereby giving better yields of the desired product.

The required raw materials for this process are readily available. α,p-Dimethylstyrene is a commercially available monomer used for the prepartion of plastics and resins. The tert-butylethylene is easily obtained in good yield by the procedure described by A. Brandstrom, Acta Chem. Scand. 13, 612–613 (1959), No. 3, which employs tert-butanol, ethylene gas, hydrogen chloride, and aluminum chloride catalyst—all of which are inexpensive materials. An alternate procedure for this olefin is that reported by Lorz, Mills, Shalit and Michael in Industrial and Eng. Chem., vol. 53, page 873 (1961), where the readily-available "neohexane" is catalytically dehydrogenated to yield "neohexene" (3,3-dimethyl-1-butene).

The pure 1,1,3,4,4,6-hexamethyl-1,2,3,4-tetrahydronaphthalene formed by the process of this invention is of value as an intermediate for the preparation of musk odorants. The acetyl derivative is a colorless solid, M.P. 56–57° of strong and persistent musk-like odor.

In order more fully to exemplify this invention, the following examples are given, by way of illustration and not limitation. The parts or percentages are by weight and the temperatures are in degrees centigrade.

EXAMPLE I

*Preparation of 1,1,3,4,4,6-hexamethyl-1,2,3,4-tetrahydronaphthalene*

Into 150 g. of α,p-dimethylstyrene, cooled to −10°, was passed 45 g. of hydrogen chloride gas, with stirring and cooling, over a 3 hr. period. Then the reaction solution was stirred for 1 hr. longer. The resulting crude dimethyl-p-tolylcarbinyl chloride was mixed with 84 g. of t-butylethylene and slowly added dropwise to a suspension of 10 g. of $AlCl_3$ granules in 100 g. of ethylene dichloride with stirring, while the temperatures was maintained at −7 to −2°. The mixture was stirred for 30 min. longer after feeding was complete. The reaction product was then quenched on 200 g. of cracked ice plus 200 g. of ice-cold water. There was added 100 ml. of toluene to aid in separation. After settling, the lower aqueous layer was run off and discarded. The remaining toluene solution was washed successively with 5% HCl (200 ml.), water (2 x 200 ml.), 5% sodium carbonate (200 ml.), and again with water (3 x 200 ml.), filtered and distilled. The desired 1,1,3,4,4,6-hexamethyl-1,2,3,4-tetrahydronaphthalene was obtained as a colorless fraction, B.P. 95–100° (2 mm.), which rapidly solidified and amounted to 117 g. (54.2% of theory). The distilled product congealed at 56–60°. Crystallization from isopropanol gave 97 g. of colorless crystals, M.P. 66–67°.

*Analysis.*—Calcd. for $C_{16}H_{24}$: C, 88.82, H, 11.18. Found: C, 88.80; H, 11.06.

Analysis of the mass spectrum showed a parent peak clearly indicating a molecular weight of 216.

The infrared spectrum of the hydrocarbon showed the following principal characteristic bands (demountable cell) 3.37 s., 5.23 w., 5.65 w., 6.15 m.w., 6.64 s., 6.77–6.85 s., 7.18 m., 7.77 m., 7.82 m.s., 7.86 w., 8.00 m.w., 8.32 m., 8.67 w., 9.01 m.w., 9.19 m.w., 9.35 m., 9.60 w., 10.19 w., 10.45 w., 11.03 w., 11.34 m., 11.85 w., 12.32 s., 13.18 w., 15.05 w. microns. The band at 7.60–7.65μ usually found in indans does not appear. The pattern in the 5 to 6 micron region, 5.23 w. and 5.65 w., combined with the strong band at 12.32μ is characteristic of a 1,2,4-trisubstituted benzene. The structure of the hydrocarbon formed in accordance with this example has been confirmed by study of its nuclear magnetic resonance (NMR) spectrum. The NMR trace shows a total of six methyl groups identified as follows: one doublet centered at 0.95 p.p.m., four saturated methyls at 1.03, 1.22, 1.25 and 1.30 p.p.m., and one benzylic methyl at 2.45 p.p.m. There appear protons, giving a multiplet centered at 1.6 p.p.m., similar to those of β-saturated-ring protons of previously studied 1,2,3,4-tetrahydronaphthalene structures. These appear up field compared to analogous protons of indan structures. The three protons on the aromatic ring show as a quartet for two ortho protons plus a third peak superimposed.

The dinitro derivative, M.P. 113–114°, was obtained as a pale yellow solid of musk odor.

*Analysis.*—Calcd. for $C_{16}H_{22}N_2O_4$: C, 62.70; H, 7.24; N, 9.15. Found: 62.70; H, 7.20; N, 9.20.

EXAMPLE II

*Preparation of 1,1,3,4,4,6-hexamethyl-7-acetyl-1,2,3,4-tetrahydronaphthalene*

A solution of 108 g. (0.5 mole) of 1,1,3,4,4,6-hexamethly-1,2,3,4-tetrahydronaphthalene, M.P. 66–67° (preparation described in Example I above), 45 g. (0.573 mole) of acetyl chloride and 108 g. of ethylene dichloride was added with vigorous agitation to a suspension of 80 g. of granular $AlCl_3$ in 216 g. of ethylene dichloride over a period of 45 minutes while the reaction temperature was maintained at 20 to 22°. There was copious evolution of hydrogen chloride gas during the addition. The mixture was then warmed to 40° during a 15 min. period and then cooled and quenched on 400 g. cracked ice. The ethylene dichloride solution of the product, which separated, was washed three times with water (100 ml. washes) and then with 100 ml. of 5% sodium bicarbonate solution. The ethylene dichloride was distilled under reduced pressure and the residual liquid vacuum-distilled over 2 g. of sodium carbonate powder. The product, boiling at 142–143° (3 mm.), was a colorless vicous liquid, of strong musk odor which solidified on standing and amounted to 102 g. Its congealing point was 35.5° and melting point 41°. After twice recrystallizing from ethanol its melting point was 56–57°.

The product was colorless and had a strong musk-like odor.

*Analysis.*—Calcd. for $C_{18}H_{26}O$: C, 83.68; H, 10.14. Found: C, 83.87; H, 9.80.

EXAMPLE III

*Preparation of 1,1,3,4,4,6-hexamethyl-1,2,3,4-tetrahydronaphthalene*

Anhydrous hydrogen chloride, 35 g., was fed into 107 g. α,p-dimethylstyrene over a 3 hr. period while the reaction temperature was maintained at −10 to −7°. The resulting crude dimethyl p-tolyl carbinyl chloride was mixed with 60 g. of t-butylethylene ("neohexane") and this solution was added dropwise into an agitated suspension of 10 g. of anhydrous aluminum bromide in 100 g. of ethylene dichloride over a 1 hr. period while the reaction temperature was maintained at −7 to 0°. The mixture was stirred for 30 min. longer after the feeding was complete. The batch was quenched on 200 g. of cracked ice mixed with 200 g. of water. One hundred grams of toluene was added to help separation. The resulting oil layer was washed successively with 200 ml. of 5% aqueous HCl, 200 ml. water, 200 ml. of 5% aqueous sodium carbonate, and finally three times with 200 ml. portions of water. The oil layer was then filtered through filter-cel and vacuum-distilled over 1 g. of sodium bicarbonate. There was obtained 64 g. (41.5%) of product, B.P. 98–100° (2 mm.), which rapidly solidified in the distillation receiver. Crystallization from twice its weight of isopropanol gave 52 g. of colorless crystals, M.P. 66–67°. This product was identical with the one obtained by the procedure of Example I above.

The foregoing illustrates the practice of this invention, which, however, is not to be limited thereby, but is to be construed as broadly as permissible in view of the prior art and limited solely by the appended claims.

We claim:
1. The process for making 1,1,3,4,4,6-hexamethyl-1,2,3,4-tetrahydronaphthalene, which comprises reacting dimethyl-p-tolyl-carbinyl halide and tert-butylethylene, in the presence of a Friedel-Crafts catalyst at a low temperature.
2. The process of claim 1, wherein the halide employed is formed from α,p-dimethylstyrene and hydrogen halide.
3. The process of claim 2, wherein the hydrogen halide is hydrogen chloride.
4. The process of claim 2, wherein the Friedel-Crafts catalyst is aluminum chloride.
5. The process of claim 2, wherein the temperature at which the reaction is conducted is within the range from about −10° C. to about 10° C.

6. The process for making 1,1,3,4,4,6-hexamethyl-1,2,3,4-tetrahydronaphthalene, which comprises reacting substantially equi-molecular amounts of dimethyl-p-tolyl-carbinyl chloride and tert-butylethylene, in the presence of aluminum chloride catalyst, at a temperature within the range from about −10° C. to about 10° C.

References Cited by the Examiner

UNITED STATES PATENTS

| 2,897,237 | 7/1959 | Carpenter et al. | 260—668 |
| 2,915,561 | 12/1959 | Carpenter et al. | 260—618 |
| 3,045,047 | 7/1962 | Davidson et al. | 260—668 |

DELBERT E. GANTZ, *Primary Examiner.*

C. R. DAVIS, *Assistant Examiner.*